United States Patent [19]
Bögel

[11] Patent Number: 4,781,503
[45] Date of Patent: Nov. 1, 1988

[54] FASTENER ASSEMBLY FOR SECURING ROOFING ON A SOFT INSULATION MATERIAL TO A SOLID BASE

[75] Inventor: Gerhard Bögel, Balgach, Switzerland

[73] Assignee: SFS Stadler AG, Heerbrugg, Switzerland

[21] Appl. No.: 8,077

[22] Filed: Jan. 27, 1987

Related U.S. Application Data

[63] Continuation of Ser. No. 622,537, Jun. 20, 1984, abandoned.

[30] Foreign Application Priority Data

Jun. 22, 1983 [AU] Australia ............................ A2296/83

[51] Int. Cl.⁴ ........................ F16B 33/00; F16B 43/00
[52] U.S. Cl. .................................... 411/368; 411/353; 411/533; 411/544; 52/410
[58] Field of Search ................ 411/155, 156, 368–370, 411/371, 533, 480, 481, 352, 353, 387, 544; 52/410, 512

[56] References Cited

U.S. PATENT DOCUMENTS

| | | | |
|---|---|---|---|
| 2,922,456 | 1/1960 | Kann | 411/353 |
| 3,118,718 | 1/1964 | Babey | 411/353 X |
| 3,221,588 | 12/1965 | Wieber | 411/387 |
| 3,415,064 | 12/1968 | Talobre | 411/531 X |
| 4,095,430 | 6/1978 | Hannan | 411/531 X |
| 4,157,725 | 6/1979 | Stanaitis | 411/531 X |
| 4,380,413 | 4/1983 | Dewey | 411/161 |
| 4,462,730 | 7/1984 | Knohl | 411/371 |
| 4,545,270 | 10/1985 | Dewey | 52/512 |
| 4,630,984 | 12/1986 | Reinwall et al. | 411/368 |

FOREIGN PATENT DOCUMENTS

| | | | |
|---|---|---|---|
| 2740432 | 3/1979 | Fed. Rep. of Germany | 411/337 |
| 45-31771 | 10/1970 | Japan | 411/368 |

*Primary Examiner*—Neill R. Wilson
*Attorney, Agent, or Firm*—Toren, McGeady & Associates

[57] ABSTRACT

A fastener assembly for securing roofing on soft insulation material to a solid base is formed of an axially elongated screw and a large surface washer. The screw has an elongated shank with a cutting tip at one end and a screw head at the other. A self-cutting thread is formed on the shank. The shank has a thread-free section extending from the screw head. The thread-free section has a diameter not greater than the diameter of the opening in the washer into which the screw is inserted. The washer has a countersunk area around the screw opening to receive the screw head in a recessed manner. The shank of the screw, at a spaced distance from the screw head and in the axially extending region of the thread-free section has a stop or similar member which forms a support for the washer. With the assembly secured to the solid base, the washer is tiltable relative to the screw. Accordingly, the fastener assembly can be stepped on without any damaging transfer of stress from the washer to the screw.

5 Claims, 6 Drawing Sheets

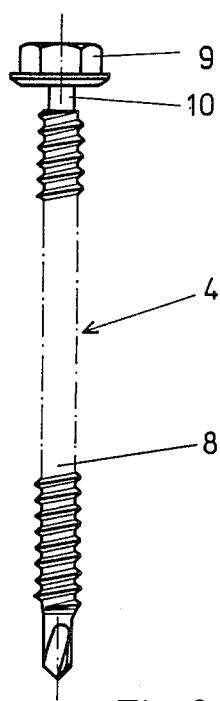
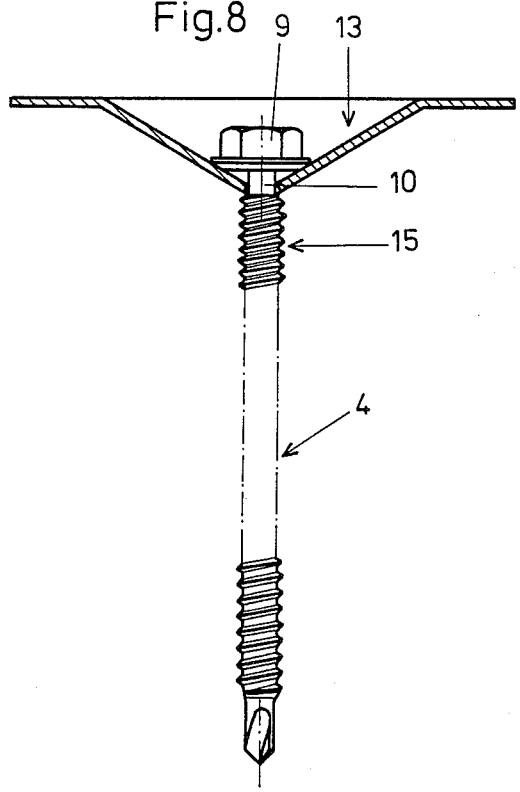
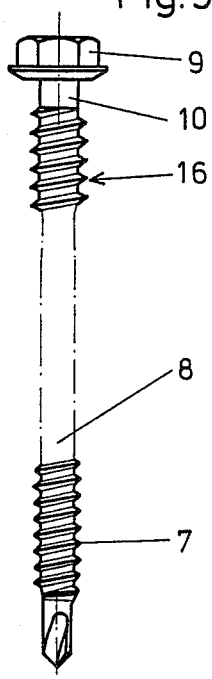
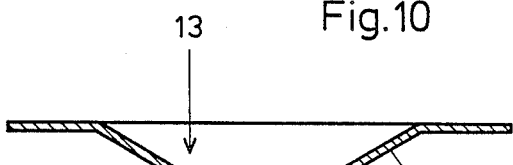
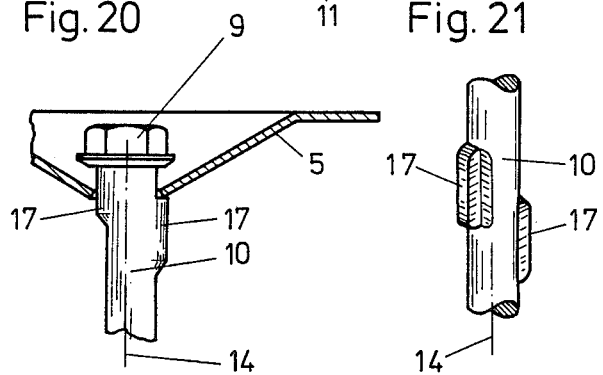
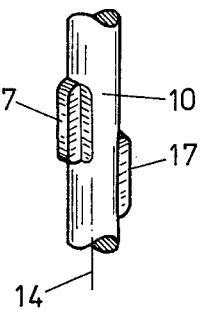

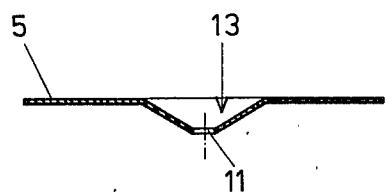
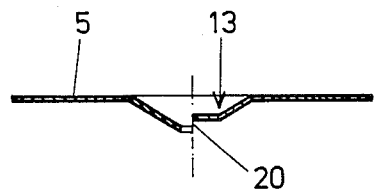
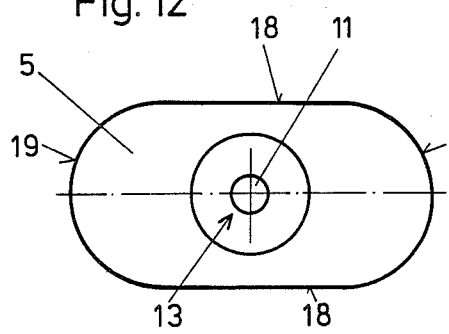
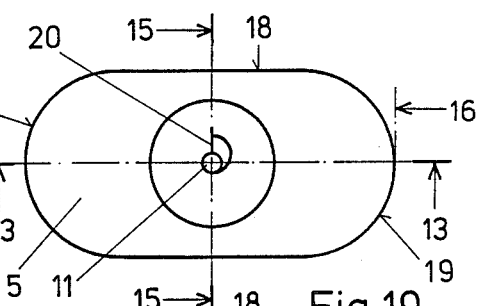
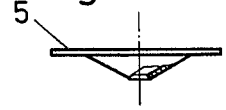
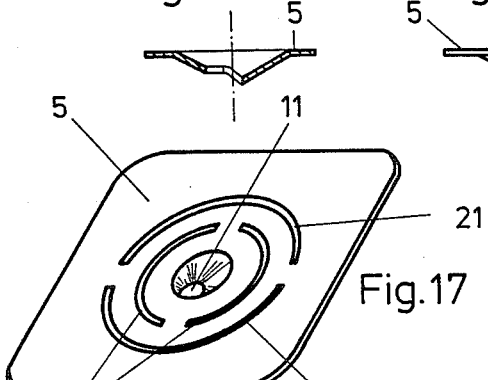
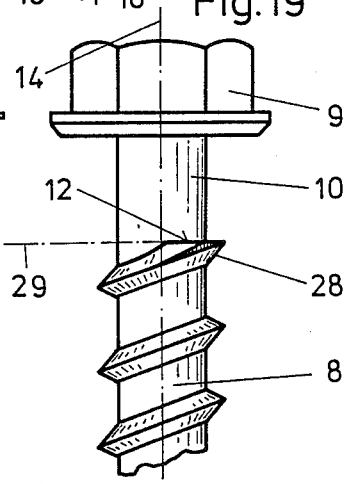
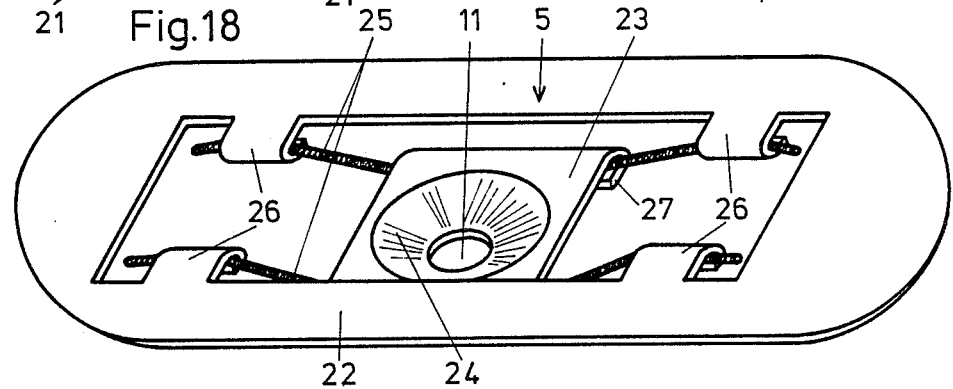

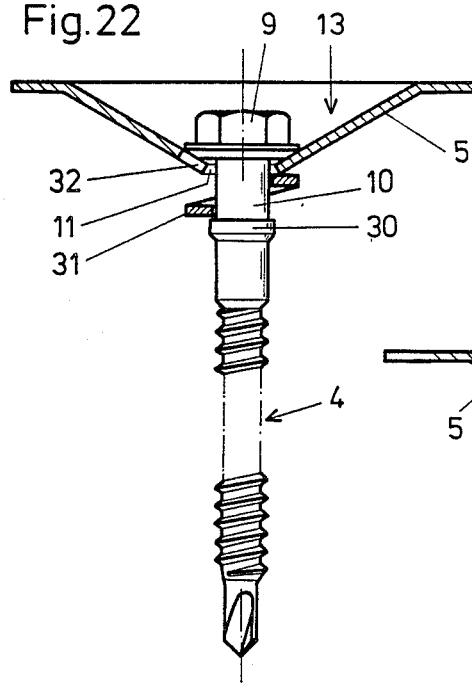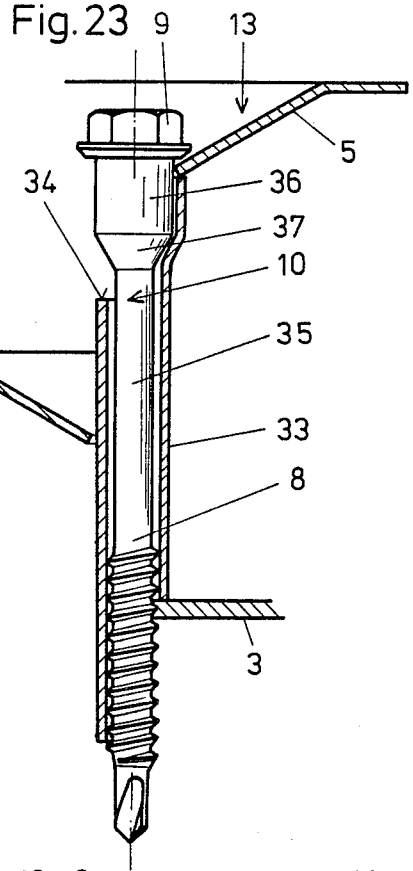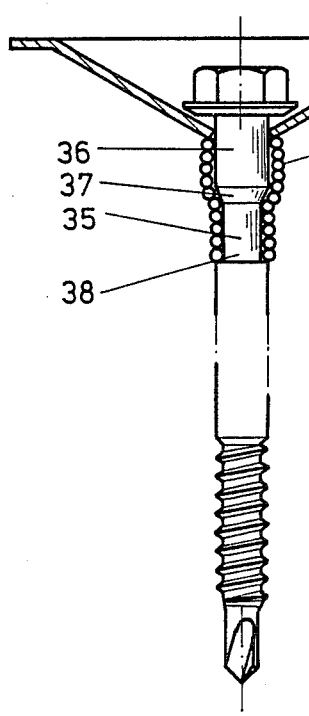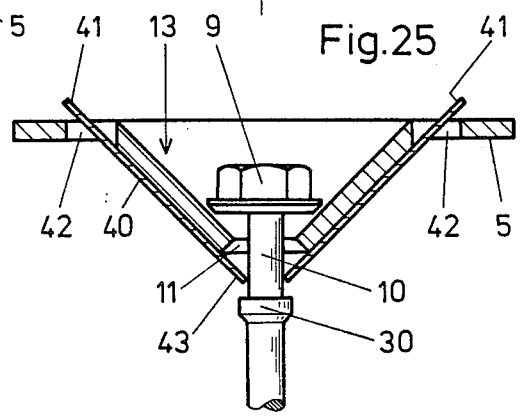

FASTENER ASSEMBLY FOR SECURING ROOFING ON A SOFT INSULATION MATERIAL TO A SOLID BASE

This is a continuation of application Ser. No. 622,537, filed June 20, 1984 now abandoned.

SUMMARY OF THE INVENTION

The present invention is directed to a fastener assembly for securing roofing on a soft insulating material to a solid base. The fastener assembly is made up of a self-drilling and self-thread cutting screw and a large surface washer. The screw has a cutting tip at one end and a screw head at the other with a shank extending between the tip and the screw head. A thread-free section of the shank extends from the screw head and has a diameter not greater than the diameter of the opening in the washer into which the screw is inserted. The surface of the washer is countersunk to provide a recess into which the screw head can be located. Fastener assemblies of this general type are used for securing insulation materials to a firm support or solid base, for instance, securing insulation plates on roofs. Such insulation has paper or foil coverings which form a seal on one surface. In attaching the insulation material, fastener assemblies in the form of screws and relatively large surface washers are employed to provide a good support. A water-tight sealing material is then applied over the insulation.

When materials are transported on a roof, it may happen that a worker steps on or close to a washer or that a vehicle or tool moves over the washer. Locally applied forces of this type tend to displace the screw head through the sealing material with the washer penetrating the roofing material applied on the insulation material. The resulting damage leads to a roof which is not liquid-tight.

Further, there are certain insulation materials which collapse after a period of time. When the insulation material is first set in place it has sufficient resistance so that it can be walked on. After two or three years, however, the insulation material settles and has a reduced thickness. As a result, the roofing follows the movement of the insulation material and the fastener which is threaded into a solid base, such as a plate, now projects upwardly from the surface of the roofing. The possibility of damage due to a rubbing or abrasion action is obvious. In relatively hard insulation material, a distance of the screw head from the above-mentioned level or surface of 2 to 3 mm is sufficient. For soft insulation materials, such as mineral or fiber insulation which collapse after a period of time, a design which is safe to walk on must be required. It is important that an increased surface is provided so that passages are not developed by abrasion or by the movement of the fastener assembly through the secured material.

Though the washer is either firmly connected with the screw or is axially movable relative to it, not all of the disadvantages that have been experienced can be eliminated. Fastener assemblies of a known type are displaced into an inclined position when walked on or driven over. The most inclined position of the fastener assembly, as is known, taking the allowable stress in the assembly into consideration, rests on the solid base, that is, a plate or the like. The forces which still occur are so small that folding up of a metal washer cannot take place. In the embodiment disclosed in German Offenlegungsschrift No. 31 06 844 only the attachment of the insulation material is important. For such attachment, however, no seal is necessary. Even in the placement of the roofing foil, it is not important to provide a seal between the foil and the fastening means. In addition, sealing is guaranteed by suitably overlapping the embodiment it relates particularly roofing foil. In this known embodiment it relates particularly also to a non-rotation of the washer. To avoid such rotation, radially arranged ribs are provided. In washers which are provided with ribs, problems result during separation of the washers in automatic placement devices. The placement depth and consequently the character of the tightening operation cannot be exactly controlled. Usually the counterpressure is generated by threading in the screw until the plate is tightly pulled, and in a soft insulation material is even deepened in cup-like manner. For this purpose no additional pressure must be applied. To remain permanently functional in extremely soft insulation materials, the axially moving plate in another known embodiment, German Offenlegungsschrift No. 31 37 836, it would need a significantly longer axial range of play. Extremely deep cups have been known for years, they have been used only for the extension of screws which are free of cold bridges. Plates with such deep cups can no longer be used economically in automatic setting devices.

The fastening elements also serve for the direct fixation of the roofing or roof sheeting. The roofing foil is attached in the seam where the counterpressure of the insulation is desirable. Once the counterpressure decreases, the foil hangs from the fastener. In such a situation, only limited tensile stresses can be absorbed.

Therefore, it is the primary object of the present invention to avoid the disadvantages of known fastener assemblies of the type mentioned above and to provide a system for fastening insulation material which can be safely walked upon.

In accordance with the invention, at a distance from the screw head in a thread-free section of the shank or at the end of the thread-free section, a stop which may possibly be in the form of a projecting collar, a projection or the like is arranged to support the washer in the area around the opening so that the washer can be tilted relative to the screw axis in the assembled and attached condition.

In accordance with the present invention, a fastener assembly for securing insulation material is provided which is genuinely safe to walk on and can be easily exposed to additional stresses without causing any damage of the applied foil or surface material or any loosening of the screw.

Users of mechanical fasteners for roofing foil materials have considerable doubts concerning the anchoring safety of screws in thin supporting plates, particularly during the repetitive stress caused by suction forces which are to be expected. Moreover, due to the continuous alternating stress and bending of the screws when the washers are walked on, a loosening of the threaded connection occurs. In accordance with the present invention, however, since the washer is tiltable relative to the axis of the screw, when stress is applied to the washer it does not necessarily result in a bending stress on the screw, instead the washer can move relative to the screw. Therefore, the present invention reduces the danger of a so-called (levering out) of the screw from the support plate or solid base.

Even if the insulating material collapses after a period of time, the screw heads do not project outwardly from the insulating material, rather the washers do not follow the movement of the insulating material during its collapse. Therefore, the danger that the roofing may wear through due to a chafing or abrasion action does not take place.

With the simple structural elements of a screw and a washer, a fastener assembly is obtained which functions in an optimum manner especially for use in securing roofing and insulation materials.

The problem experienced in the prior art is overcome only with the measures provided by the present invention, that is, the arrangement of a stop or similar member on the shank of the screw for supporting the washer so that the washer can move relative to the screw axis. As a result, though the washer is displaced no bending stresses occur in the screw itself and the screw cannot be loosened. Further, due to the stop or support for the washer, it cannot be pressed into the insulation material rather the screw head remains for all practical purposes retained in the recess position in the washer, because the washer cannot move downwardly over the stop on the screw.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 7 is a view similar to FIG. 6 illustrating another embodiment of a screw;

FIG. 8 is a view similar to FIG. 6 showing another embodiment of the present invention with a washer mounted on the screw;

FIG. 9 is an elevational view of yet another embodiment of the screw of a fastener element;

FIG. 10 is a sectional view of the washer illustrated in FIGS. 6 and 8;

FIGS. 11 and 12 are views of another washer shown in longitudinal section in Fi 11 and in plan view in FIG. 12;

FIGS. 13 to 16 illustrate another embodiment of the washer with FIG. 13 displaying a sectional view taken along the line 13—13 in FIG. 14, FIG. 15 providing a sectional view along the line 15—15 in FIG. 14, and FIG. 16 a side view taken in the direction of the arrow C in FIG. 14;

FIGS. 17 and 18 illustrate two further embodiments of the washer shown in perspective;

FIG. 19 is a partial elevational view of a screw displaying another embodiment of the present invention;

FIGS. 20 and 21 are partial views of two additional embodiments of a screw with specially formed stops for the washer;

FIGS. 22 to 24 afford still further embodiments of screws with different supporting stops for the washers, with FIG. 23 showing the washer in two different positions;

FIGS. 25 and 26 show still another embodiment of the fastener assembly with FIG. 25 appearing as an elevational view with the washer shown in section and FIG. 26 is a perspective view;

DETAIL DESCRIPTION OF THE INVENTION

Figure 1:
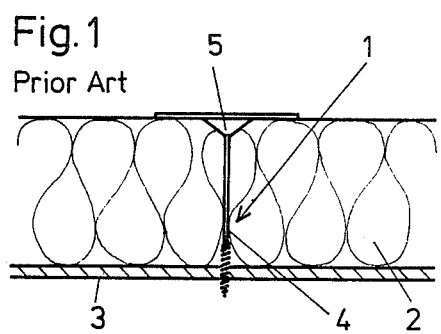
FIGS. 1 and 2 illustrate a prior art fastener assembly and show in FIG. 2 the effect when stress is applied to the assembly.

In FIGS. 1 to 4 a fastener assembly 1 is shown securing insulation material 2 to a solid or firm base 3, such as a metal plate. The fastener assembly 1 is made up of a screw 4 and a washer 5 which has a relatively large surface. Preferably, the screw 4 is a self-drilling and self-thread cutting member.

Figure 2:
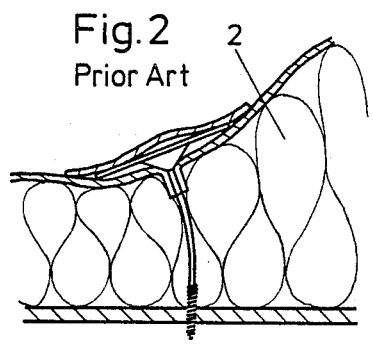

When a fastener assembly 1 is used with the washer 5 connected rigidly with the screw 4, then the screw or its shank participates in any movement of the washer. In embodiments known to-date, such as shown in FIG. 2, displacement of the washer results in a bending stress on the screw shank and, particularly during alternating stresses, the screw is loosened and its threads destroyed.

Figure 3:
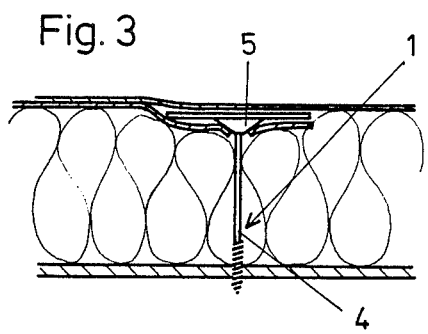
FIGS. 3 and 4 are views similar to FIGS. 1 and 2, respectively, illustrating the present invention and displaying the assembly in FIG. 3 where no stress is applied and in FIG. 4 where stress has been applied to the washer.
Figure 4:
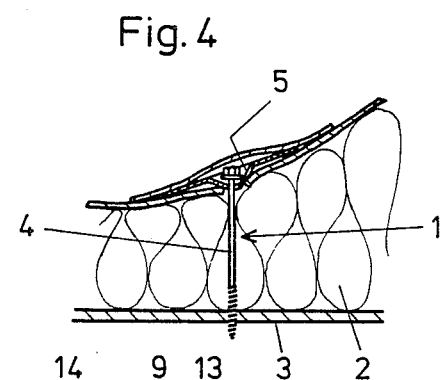

If, as shown in FIGS. 3 and 4, the washer 5 is arranged so that it can be tilted relative to the axis of the screw, if the washer is displaced, the screw, that is the screw shank, remains in its original vertical position. Accordingly, if the washer is caused to move, the screw does not become loosened and there is no damage to the roofing or the insulating material 2 as a result of movement of the washer.

Figure 5:
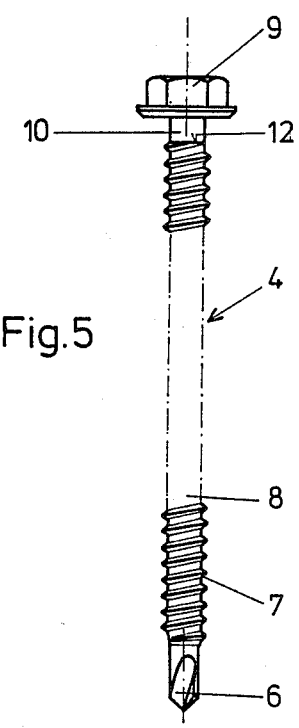
FIG. 5 is an elevational view showing a screw.
Figure 6:
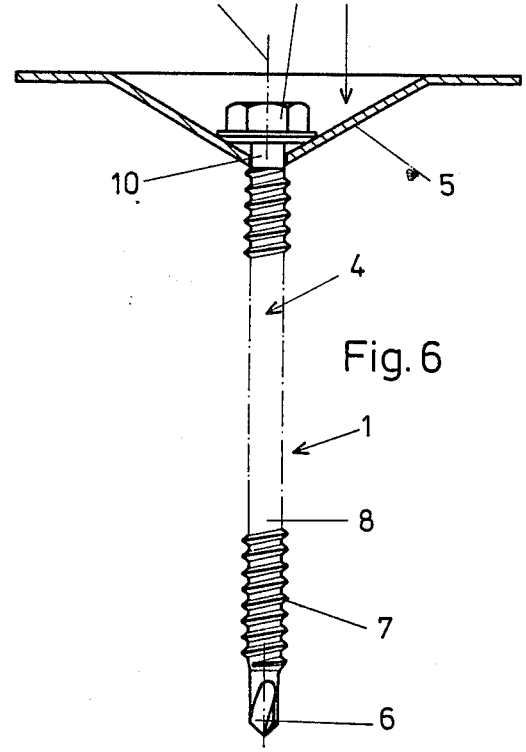
FIG. 6 is an elevational view of the fastener assembly formed by a screw and a washer mounted on the screw.
Figure 33:
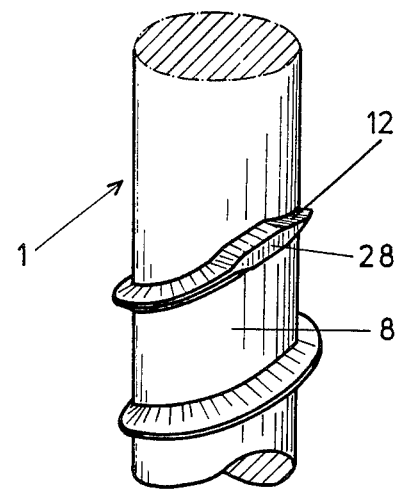
FIG. 33 a partial elevational view of the screw displaying another embodiment similar to the arrangement shown in FIG. 19.

A fastener assembly 1 of the type illustrated in FIGS. 3 and 4 is shown in more detail in FIGS. 5 and 6. The fastener assembly 1 includes a screw 4 and a washer 5. The screw 4 is both a self-drilling and a self-thread cutting member. Accordingly, the screw 4 include an axially elongated shank 8 with a cutting tip 6 at one end. A thread 7 is formed along the axial direction of the shank and a screw head 9 at the opposite end from the cutting tip. The washer 5 is a large surface member according to its intended use. At the end of the shank 8 extending from the head 9 there is a thread-free section 10 having a diameter equal to or less·than the diameter of the opening 11 in the washer 5, note FIG. 10. Spaced axially from the screw head 9, a stop, collar, projection or similar part 12 is formed on the shank 8. In the embodiment illustrated in FIGS. 5 and 6, the stop is formed by the end of the thread 7 and preferably a reinforced thread chamfer such as shown in FIGS. 19 or 33, can be provided.

As shown in FIG. 6, the upper surface of the washer 5 in the region laterally encircling the opening 11 is countersunk or the like, forming a conically shaped recess in which the screw head 9 is located so that upper surface of the screw head is spaced downwardly from the upper surface of the washer. With this arrangement of the thread-free section 10 and the stop 12, the washer can be tilted or displaced from its original position relative to the screw axis 14, so that an attachment of the insulating material is provided which is safe to walk upon. If downward pressure is exerted on the washer 5 it is merely tilted with respect to the screw axis 14 and, though the washer moves out of its original position, there is no bending stress exercised on the screw 4 or on the threaded connection between the screw and the solid base 3.

The washer 5 has an opening with a diameter corresponding approximately to the core diameter of the screw thread 7. Further the thread-free section 10 has approximately the same diameter as the core diameter of the thread on the shank 8. The screw 4 is inserted through the opening 11 in the washer 5 so that the washer can be freely moved about the thread-free section 10 below the head 9. Therefore, the placement of the fastener assembly 1 can be attained by threading the screw 4 into the base 3. The placement of the fastener assembly is no longer dependent on the pressure of the plate.

When a relatively short screw is used, the time required to thread the entire axial length of the screw through the washer is acceptable. In fastener assemblies of greater axial length, it is possible to provide a short supporting thread 15 or 16 as illustrated in FIGS. 8 and 9, respectively. Since such screws are manufactured in a non-cutting procedure by means of rollers, a transition area is provided on the shank with a thread-pitch diameter In the embodiment displayed in FIG. 7, the threaded section 8 of the shank has a continuous thread over its axial length, however, the thread-free section 10 has a smaller diameter than the core diameter of the threaded section. This embodiment with the washer 5 mounted on the screw 4 is set forth in FIG. 8. In FIG. 8 the supporting thread 15 adjacent the thread-free section is formed as a double thread. As can be appreciated, several courses of thread could be used. In the embodiment of FIG. 9, the supporting thread 16 adjacent the thread-free section 10 has a larger thread-pitch diameter than the thread 7 located along the forward portion of the shank 8. Accordingly, the securing or anchoring thread may have the same outside diameter as the supporting thread 15,16 located adjacent the thread-free section 10 or different diameters may be used.

It has been surprising to note, in spite of enlarging the opening 11 in the washer 5 to the thread-pitch diameter, if interposed sections with thread-pitch diameter are provided, supporting forces in the magnitude exceeding 150 kp remain at an outer diameter of 4.8 mm and at a plate ST 37 in a thickness of 0.9 mm used as the firm or solid base or support. This arrangement affords a very economical solution.

In the embodiment of FIG. 8, where the supporting thread 15 is a double thread, the washer 5 reaches the free space formed by the thread-free section more rapidly and is supported by two end thread ribs. If a more slender thread rib than in the supporting thread is used, it is possible to go beyond the outer diameter of the supporting thread.

The manufacturing costs of the embodiment shown in FIG. 9 are somewhat more expensive. In this arrangement, however, higher supporting forces for the washer are available. The retaining thread 16 is intentionally larger than the anchoring thread 7.

In FIGS. 20 and 21 a special embodiment of the fastener assembly is illustrated in the region of the thread-free section 10 of the shank 8. When a screw 4 is threaded into the washer 5, the washer can pivot about the radially outwardly projecting cams 17. In the assembled position a portion of the opening 11 rests on the projection 17. This arrangement is sufficient to provide adequate low pressure protection against snow or when the roofing material is accidentally walked upon. The projecting cams 17 can be formed in a stamping operation as is shown in FIG. 21. Such stampings are known for use with winged screws. In the embodement shown in the drawing, however, the cams 17 have a completely different function. In the illustrated embodiment, two cams 17 are located extending in the axial direction of the screw and the cams are located opposite one another, that is, spaced 180° apart. When the washer 5 is placed on the screw a simple back and forth movement is sufficient to complete the assembly. It would also be possible to provide a number of such cams on the periphery of the thread-free section 10, wherein corresponding measures for the placement of the washer must be effected. To guarantee adequate stability of the washer 5, the cams 17 overlap in the long or axial direction of the screw, whereby a genuine tilting or pivoting of the washer by a specific amount is necessary to assembly or remove it.

In the embodiment displayed in FIG. 10 as well as in the embodiments provided in FIGS. 11 to 16, the washer 5 has a conical or funnel-shaped recess 13. The recess is of such a size that the head 9 of the screw 4 can be completely received within the recess.

In the embodiment set forth in FIGS. 11 to 16, in plan view the washer has a pair of parallel long sides 18 and circularly rounded short sides 19. Such an embodiment, because of the special shape of the washer, is particularly suited for use in automatic placing devices for fastening roofing foils and other roofing materials. In the special embodiment in FIGS. 13 to 16, the opening 11 in the washer 5 through which the shank 8 of the screw 4 extends, has a radial cut 20 or a corresponding slot or the like, so that the thread on the screw can pass through the cut 20. In this way, the passage of the screw through the opening in the washer is effected in a simple manner without causing any impairment in the supporting force of the washer.

The position of the radial cut 20, which affords the passage of the thread on the screw through the washer, is determined so that separation of the washer in an automatic placing device can be carried out effectively. In the wrong position, the placing device would be blocked. The cut 20 produces a gap or opening in the plane 15-15. Such an opening, at least after passage of the reinforced thread chamfer, hinders a reverse rotation of the screw in the embodiment as shown in FIGS. 19 or 33. This effect can be augmented if the plate is formed of a resilient material. After the passage of the threaded section of the screw through the opening in the washer, the opening or gap afforded by the cut 20 closes by an amount which completely prevents any return movement through the gap during a reverse rotation of the screw. Consequently, this embodiment positively locks the screw against any reverse rotation.

Due to the seam attachment of the prepared roofing, the washer is in to secure it against rotation. Various materials may be utilized for such a washer, preferably soft iron. It is also possible to use a plastic plate as the washer.

In FIGS. 17 and 18 another possible special construction of the washer is illustrated. As can be seen in these figures, when the center of the washer 5 is sufficiently recessed, a certain safety is afforded when the fastener assembly is stepped on. In the feeding or placement operation, during placement using an automatic placing device, the washer 5 must be as flat as possible. As mentioned above, deep cups cannot be economically applied with such an automatic placing device. The deep cup is achieved by recessing the center of the plate or washer. In the embodiment shown in FIG. 17, the washer coaxial with the center opening 11, has concentrically extending groove sections 21 with the groove sections 21 having different diameters so that a plurality of partially encircling grooves are arranged relative to one another. The radially spaced groove sections are offset angularly relative to one another. With this arrangement a certain flexibility is provided around the opening 11 which provides a satisfactory recessing possibility. Such an arrangement, however, can only be used for square or circular washers 5.

In the embodiment set forth in FIG. 18, the washer is made up of two parts 22,23 which are adjustable relative to one another and includes an outer frame part 22 and a center part 23 containing the opening 11. A countersunk section 24 may be provided around the opening. Center part 23 is enclosed laterally by the frame part 22. The two parts 22,23 are interconnected by elastic connecting means 25. Due to the interconnection, the center part 23 is adjustable relative to the frame part 22 with respect to the contact plane of the washer 5. In an advantageous embodiment, the center part 23 is supported by clipping two of its sides to the elastic connecting members 25 which members, in turn, are clipped to the frame part 22.

In FIG. 19 another embodiment of the screw 4 is displayed particularly directed to the end of the threaded section 8 adjacent the thread-free section 10. The end of the thread 28, at the thread-free section 10, is reinforced or widened so that a significantly larger supporting surface 12 is afforded. Further it is advantageous that the end of the thread 28 at the thread-free section 10 is cut off in a plane 29 extending perpendicularly of the axis 14 of the screw. Such a construction affords a relatively large supporting surface extending around the corresponding peripheral area of the screw, that is, the stop 12 extends for a considerable angular extent about the shank of the screw.

Another special embodiment of the reinforced thread chamfer, that is,at the end of the thread adjacent the thread-free section 10, is illustrated in FIG. 33. It can be seen that the thread profile on the shank 8 changes from a triangular thread rib cross-section to a trapezoidal cross-section of approximately the basic width. Therefore, a relatively simple formation can be achieved by a rolling operation. As a result, the increase in the contact surface for the washer and the reinforcement of the end portion of the thread after the rolling operation is of considerable importance. It is also possible, however, in the region of the reinforcement of the end of the thread that the length of the reinforcement is increased with respect to the normal thread section so that under certain circumstances the flanks of the thread have the same angle of inclination in the reinforced section as in the normal thread section.

In the embodiment provided in FIG. 22, the thread-free section 10 has a circumferential stop collar 30 located in spaced relation, in the axial direction of the screw, from the head 9. Further, the stop collar 30 is spaced axially from the trailing end of the thread on the shank 8 of the screw. A spring element 31 is located on the thread-free section 10 extending between the stop collar 30 and the washer 5. Accordingly, the spring element 31 forms a safety disc provided under the screw head 9. The spring element 31 is helical and is formed as a wound flat spring so that the spring element can pass through a slot 32 which extends radially outwardly from the opening 11 in the washer. During any stress developed when pressure is applied to the fastener assembly 1, such as if the washer is walked upon, the spring element 31 is compressed and assumes its flat condition so that the washer is stopped from moving further downwardly.

In FIG. 23, a casing 33 laterally surrounds the shank 8 of the screw 4 and in one position is supported on the base 3 so that its upper end provides a stop collar 34 which acts as a support for the washer 5. The shank 8 and the thread-free section 10 have different diameters 35, 36 and the thread-free section has a frusto-conical section 37 forming a transition between the two different diameters. As viewed in FIG. 23, 1 on the left side the insertion position of the assembly is set forth. As the screw is inserted through the base 3 the lower end of the casing 33 contacts the base 3 and the upper end of the casing is expanded and moves over the axially extending section 36 of the thread-free section 10. Eventually, the upper end of the casing 33 with its enlarged diameter forms a stop 34 for the washer 5. Originally, the diameter of the casing is such that it can pass through the opening in the washer, however, in the expanded condition it extends radially outwardly so that it can provide the desired stop.

The casing 33 may be formed of easily deformable aluminum or plastic tubing. To facilitate the expansion of the tubing as it moves over the frusto-conical section 37 and the larger diameter section 36 of the thread-free section 10, it is advantageous if the end of the casing 33 is provided with at least one axially extending slot.

In place of the aluminum or plastic tubing, a helical spring can be used as the casing 33. Such a spring affords a type of thread replacement, however, it has the advantage of a greater restraining force when the washer rests against the spring at the end of the placement process.

There is a similar arrangement shown in FIG. 24 with a recessed section 38 provided on the thread-free section with a helical spring supported at its lower end within the recessed section. The stop for supporting the washer is provided by the uppermost coil of the spring 39.

The direct support of the washer can be provided by a punched, resilient expanding sleeve located below the washer 5 and supported on a circumferential collar on the shank of the screw or the support can be provided by spreading apart a conically widening region. Such an embodiment would be easy to manufacture as a mass produced part where high retaining forces could b guaranteed.

Figure 26:
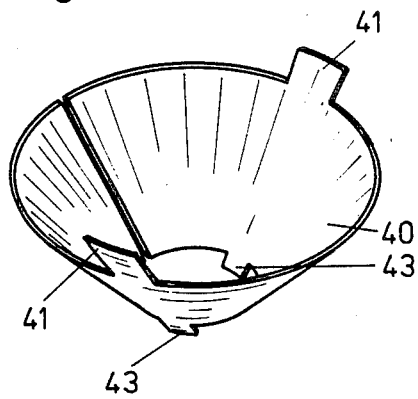

In the embodiment illustrated in FIGS. 25 and 26, an insert 40 is provided at the underside of the washer 5 and is shaped to correspond to the recess 13 and rests in a form-locking manner with the washer 5 so that it can be firmly connected to it. At its upper larger diameter edge, the insert 40 has a pair of bendable lugs 41 which project into openings 42 in the washer, note FIG. 25. After insertion, the lugs 41 can be bent downwardly into contact with the washer to provide the desired connection. At the lower smaller diameter edge of the frusto-conical insert 40, downwardly and inwardly projecting lugs 43 are arranged which serve as supports with the circumferential collar 30 forming the stop around the thread-free section 10 of the screw. In spite of the circumferentially extending collar 13, the insertion of the washer is significantly facilitated because the opening can be enlarged to move the washer over the stop collar 30. The downwardly projecting lugs 43 on the insert 40 bend outwardly in an easy manner and then snap back inwardly after moving over the stop collar 30.

Figure 27:
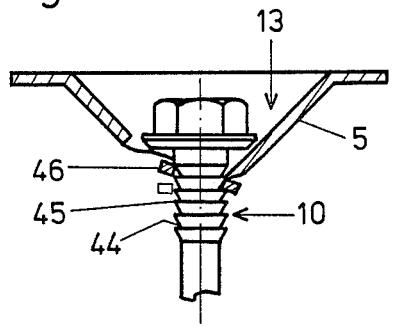
FIGS. 27 and 28 display twoadditional embodiments of screws with the washers mounted thereon.

In the embodiment set forth in FIG. 27, the thread-free section 10 of the screw 4 has a plurality of frusto-conical projections 45 forming circumferential grooves around the thread-free section so that in the overall arrangement an approximately saw-tooth cross-section is afforded for a portion of the axial length of the thread-free section. The washer 5 is punched in the area of the opening 11 so that a movable shim 46 forms the bottom of the frusto-conically shaped recess 13 in the washer. When pressure is applied, the shim 46 pivots or swivels and affords an automatic locking effect.

Figure 28:
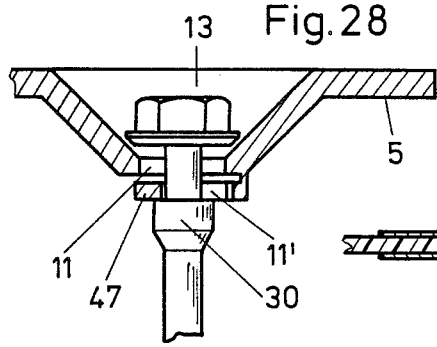

In the arrangement provided in FIG. 28, an annular lug 47 is provided spaced axially downwardly from the opening 11 in the bottom of the frusto-conically shaped recess 13 with the lug forming a second opening 11'. As can be seen in FIG. 28, the center axes of the openings 11,11' are offset relative to one another. During the insertion of the washer 5, the opening 11 and then the opening 11' are guided in sequence over the circumferentially extending stop collar 30 so that the snapping-in action occurs whereby any subsequent loosening of the assembly is not possible. There is sufficient space, however, for the tilting or pivoting of the washer 5 in relation to the axis of the screw 4.

Figure 29:
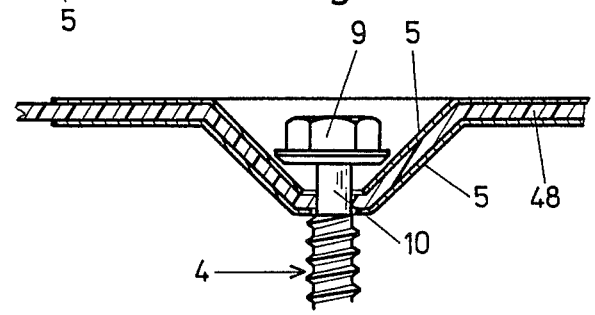
FIGS. 29 and 30 display two different views of a still further embodiment of the present invention including a pair of cooperating washers.

In the embodiment exhibited in FIG. 29, the problem of fastening roofing sheeting onto soft insulation can be solved. To-date it has been completely ignored that in soft insulation the counterpressure necessary for satisfactory fastening of the material at the seam is missing. The foil sheeting hangs at the shanks of the fastening assemblies after the insulation collapses. It is obvious that the bearing pressure of the roofing or sheeting does not afford any very large excess values. Logically, this phenomenon would have to be considered in a mechanical fastener assembly which is safe to be walked upon. A washer 5 is inserted under the seam of the roofing material and, at the same time, a second washer 5 is placed over the seam. Subsequently, screws of the above-mentioned type are threaded through the washers. The lower washer 5 which firmly seats on the thread now acts as a clamp. Such an arrangement affords a positive fixing of the roofing material. The recesses 13 of the two washers acts as a centering funnel and affords an additional resistance against the seam of the roofing material pulling away from the fastening assembly. To-date, such a double washer arrangement has not been possible with automatic placement devices, however, it is not difficult to provide a device for the placement of such a double washer embodiment.

For this double arrangement of the washers, a special embodiment is afforded in FIG. 29 where two interconnected washers 5 have corresponding punched sections and openings. Accordingly, a significant improvement in fastening the roofing material along a seam can be achieved. Such an arrangement is advantageous, of course, only when the fasteners are placed by hand. Such an arrangement interferes with use in an automatic feeding device.

In manual assembly, the washers 5 are connected by a web 49 located along a part of the rim boundary of the washers so that after pushing the combined washers onto the seam of a foil, the washers can be pressed together so that the edge area of the roofing sheeting or foil 48 is held accordingly.

Figure 30:
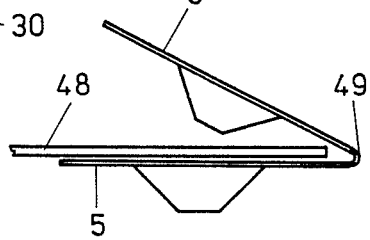

In the assembly illustrated in FIGS. 29 and 30, a saving in material can be effected, since the two washers are not constructed of the same size whereby a large washer is provided as one part and a second part is in the form of a cone with a small collar.

Figure 31:
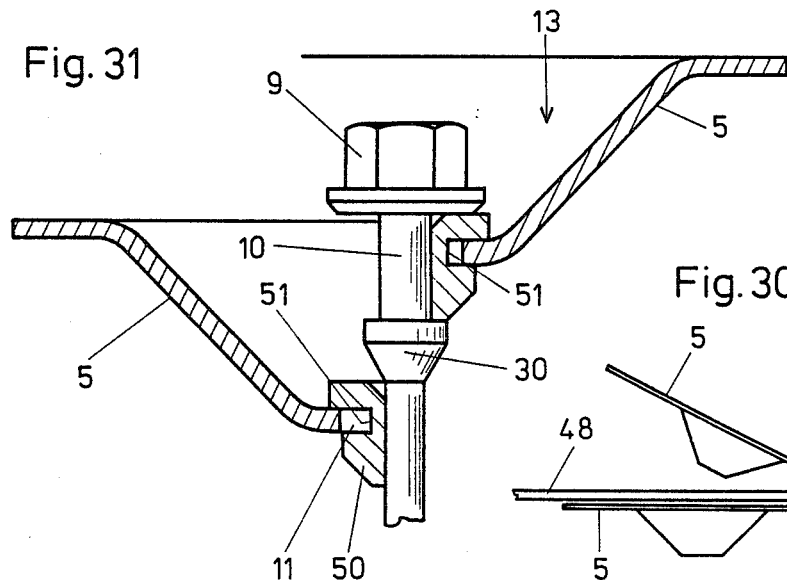
FIG. 31 is an elevational view, partly in section, showing yet another embodiment of the present invention with the washer shown in two different positions on the screw.

In the embodiment set forth in FIG. 31, in the region of the opening 11 through the washer 5, a sleeve 50 is provided tapered at one end and is provided with a circumferential groove 51 into which the rim of the opening 11 engages. The diameter of the opening 11 in the washer is significantly larger than the diameter of the base of the groove 51 in the sleeve 50 so that the washer can be moved laterally and also can be tilted. The sleeve 50 is equipped with a continuous longitudinal slot so that when moving over the stop collar 30 the sleeve can be expanded which is also possible due to the correspondingly large opening 11. After moving over the collar 30, the sleeve snaps back in around the thread-free section above the collar and the washer is held in position by the sleeve though the washer is displaceable relative to the screw.

The washer 5 can be manufactured of different materials. Due to the special embodiment shown, the washer can be manufactured perfectly of metal, and particularly because of the combustibility of roofs, such a construction is significant. The washer may also be formed of plastic.

Figure 32:
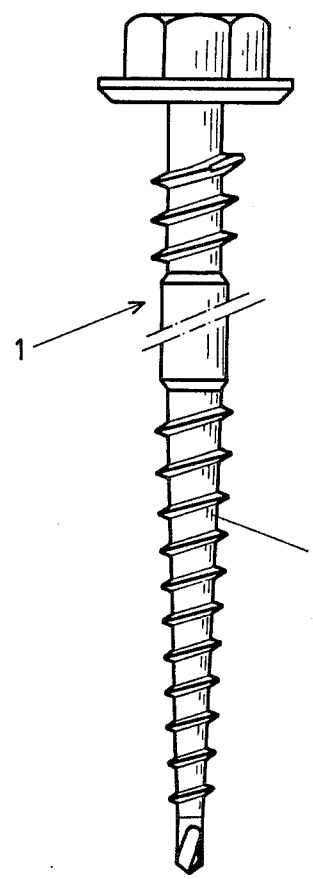
FIG. 32 is an elevational view of yet another embodiment of the screw.

In the embodiment disclosed in FIG. 32, the threaded shank 8 of the fastening assembly 1 is conically tapered toward the cutting tip. Accordingly, a considerable improvement in the safety of the securement of the screw in a thin supporting part of the solid base in a roof construction can be attained. The threaded shank 8, contrary to conventional screws, is formed slightly conical. In this way, it is assured, independently from the screw and depth, that a radial stress always exists in the sheet metal. Cylindrical screws in an expanded hole, press the hole during the continued threading procedure. Accordingly, adhesives are only of limited value. Longer screwing-in sections of the same fastener are unavoidable for practical reasons due to fluctuations of the insulation material thickness, particularly in the remodeling of old buildings. The cone angle of the screw can be selected for an intended penetration of the base at an optimum ratio which can be adjusted in the insertion and removal torque over the full range of insertion of the screw. The embodiment displayed in FIG. 32 is intended only for smaller plate thicknesses, that is, up to about 1 mm. The cone angle of the screws is, of course, so small that it is hardly perceptible to the eye. The conical arrangement of the screw can only be noticed in its effect.

The threaded sections of the screw may be of the most varied constructions. The shape of the threads can be changed depending on the intended use, this also applies to the use of double threads or multiple threads which can also be employed. Two thread sections spaced from one another on the shank of the screw may have the same or different thread shapes and both thread sections may be single or multiple threads and combinations of such embodiments are possible in both threaded sections. For special purposes, a saw-tooth thread can be employed.

The shape of the screw head is not limited to that shown in the various embodiments. A wide variety of shapes can be utilized where, depending on the use, the engagement surfaces and shapes can be changed. It is also possible to encase the screw head to afford additional corrosion protection. The encasement may be in the form of a coating or of a cap of a plastics material as well as of metal. Tests have shown that the so-called "lifting" of screws due to suction forces or special stresses can be prevented by the present invention. The lifting of the screws is not caused by a loosening resulting from a turning motion. The screw is levered out by the suction action and moves thread course by thread course. Such a jumping effect can be clearly observed in tear out tests. Though the screw has jumped by one thread rib while making a loud noise, it still retains a considerable residual pull out force. This explains the projection of certain screws which can be observed in practical applications. Only after a considerable period of time would the screws and the roofing material be torn out due to strong suction action.

Consequently, it can be assumed that the fastener assemblies are stressed unilaterally and irregularly by the roofing material. In the known embodiment where there is a rigid connection between the washer and the screw, all of the screw stresses are introduced as bending stresses to the screw in the anchoring region. If the supported washer of the present invention, which is angularly movable, is considered, it can be noted that diagonal stresses are not transferred to the screw as bending moments in the same manner. Accordingly, the danger of levering out of the screws from the support base is considerably reduced. Tests have confirmed this feature.

Therefore, based on the present invention, it is possible to fasten insulation material on a solid base so that significant advantages are obtained as compared to the known embodiments.

While specific embodiments of the invention have been shown and described in detail to illustrate the application of the inventive principles, it will be understood that the invention may be embodied otherwise without departing from such principles.

I claim:

1. A fastener assembly for securing roofing material on soft insulating material to a solid base, comprising an axially elongated screw and a plate-like washer with a opening arranged centrally in and extending through said washer with said opening having a central axis, said screw includes an axially elongated shank having a leading end and a trailing end with a screw head symmetrically located on the trailing end of the shank and a threaded section on the shank extending from the leading end toward the trailing end with the threaded section spaced axially from said screw head and arranged to be threaded into the solid base so that the screw head is spaced outwardly from the solid base, said threaded section having a core diameter, said screw head having an outside dimension extending transversely of the axial direction of said screw and outwardly from the threaded section of said shank, said shank arranged to extend co-axially with and through the opening in said washer, said shank having an axially extending thread-free section extending from the screw head toward said threaded section and said thread-free section having a diameter approximately the same as said core diameter, said washer having a large surface extending transversely of the centeral axis and outwardly relative to said screw head so that said washer extends laterally outwardly from and completely around said screw head, said thread-free section having a diameter not greater than the opening in said washer, said washer has a generally planar first surface and an oppositely facing generally planar first surface and an oppositely facing generally planar second surface in generally parallel relation with the first surface and each extending transversely of the central axis of the opening with the second surface facing toward the leading end of the screw when the screw is inserted through the opening in said washer, said washer having an annular countersunk region projecting in the axial direction of said central axis outwardly from the second surface and laterally and symmetrically encircling the washer opening and flaring outwardly away from the central axis of the opening in the direction from the second surface toward the first surface so that the countersunk region projects in the axial direction of the washer opening from said generally planar second surface, said countersunk region is dimensioned in the axial direction of said opening considerably greater than the corresponding axial dimension of said screw head and has a maximum dimension transverse of the axial direction at the first surface of said washer considerably greater than the outside dimension of said screw head with said screw head contacting said countersunk region between and spaced from said opening and said first surface whereby when said screw is inserted through said washer into a solid base said screw head is recessed completely within said countersunk region inwardly of said first surface, and means located on said shank in at the end of said threaded section adjacent said thread free section for providing a support for said washer about the opening therethrouth when said screw and washer are connected to the base and said means being spaced from said screw head by an axial dimension so that said washer is prevented by said means from moving axially toward the base relative to said threaded section of said screw and can be tilted relative to the axis of said screw without displacing said screw transversely of the axial direction thereof.

2. A fastener assembly, as set forth in claim 1, wherein said means includes stop formed by the end of said thread section of said shank at the end of said thread-free section spaced from said screw head.

3. A fastener assembly, as set forth in claim 1, wherein the end of said threaded section at the end of said thread-free section spaced from said screw head are arranged in a plane extending perpendicularly of the axis of said screw.

4. A fastener assembly, as set forth in claim 1, wherein said countersunk region is a frusto-conically shaped recess encircling the opening therethrough.

5. A fastener assembly, as set forth in claim 1, wherein said screw has a cutting tip at the leading end thereof for cutting an opening in the solid base and said threaded section having a self-cutting thread formed thereon.

* * * * *